United States Patent
Farrer et al.

(10) Patent No.: US 10,171,406 B2
(45) Date of Patent: Jan. 1, 2019

(54) MANAGING ENCOURAGING MESSAGES FROM SOCIAL MEDIA CONTACTS TO ENHANCE PERFORMANCE

(71) Applicant: INTERNATIONAL BUSINESS MACHINES CORPORATION, Armonk, NY (US)

(72) Inventors: Katie M. Farrer, Denver, CO (US); Arthur J. Meloy, Washington, DC (US); Aaron J. Quirk, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 14/951,007

(22) Filed: Nov. 24, 2015

(65) Prior Publication Data

US 2017/0149723 A1 May 25, 2017

(51) Int. Cl.
*H04L 12/58* (2006.01)
*H04L 29/08* (2006.01)

(52) U.S. Cl.
CPC .............. *H04L 51/32* (2013.01); *H04L 51/26* (2013.01); *H04L 67/18* (2013.01)

(58) Field of Classification Search
USPC ........................................................ 709/206
See application file for complete search history.

(56) References Cited

U.S. PATENT DOCUMENTS

| 8,533,269 B2 | 9/2013 | Brown |
| 8,694,594 B2 | 4/2014 | Walsh et al. |
| 8,825,445 B2 | 9/2014 | Hoffman et al. |
| 2011/0098928 A1* | 4/2011 | Hoffman ............ A63B 24/0062 702/5 |
| 2014/0172427 A1* | 6/2014 | Liu .......................... H04L 51/32 704/239 |
| 2014/0245161 A1* | 8/2014 | Yuen ....................... H04W 4/21 715/736 |
| 2015/0017614 A1* | 1/2015 | Stein ................... G06F 19/3475 434/127 |

OTHER PUBLICATIONS

Running Tech Buzz: Motigo In-Race Cheering App; Retrieved from the Internet Nov. 18, 2015; http://running.competitor.com/2015/01/shoes-and-gear/tech-buzz-motigo-race-cheering-app_121786; 9 pages.

* cited by examiner

*Primary Examiner* — Vivek Srivastava
*Assistant Examiner* — Hermon Asres
(74) *Attorney, Agent, or Firm* — Schmeiser, Olsen & Watts; Daniel R. Simek

(57) ABSTRACT

An approach is provided for managing messages for an individual. Using one or more social media services, encouraging messages are solicited from social media contacts of the individual, and in response, the encouraging messages are received from the social media contacts. The encouraging messages have a preferred sentiment and reference features of the event. One of the features is determined to be likely to be encountered by the individual within an amount of time based on a geographic position of the individual. During the event and based on the likelihood of the feature being encountered, an encouraging message is selected from the encouraging messages so that the selected encouraging message references the feature. The selected encouraging message is presented to the individual during the event.

20 Claims, 5 Drawing Sheets

MANAGING ENCOURAGING MESSAGES FROM SOCIAL MEDIA CONTACTS TO ENHANCE PERFORMANCE

BACKGROUND

The present invention relates to managing messages from social media contacts, and more particularly to generating encouraging messages via social media contacts to enhance a performance, behavior, or emotional state of an individual. Social media services provide online platforms that allow users who have a social relationship to send messages to each other and otherwise communicate, interact, and share information. Social media messages are collected and analyzed to support data mining, user attribute and behavior analysis, customer interaction and analysis, and marketing.

SUMMARY

In a first embodiment, the present invention provides a method of managing messages for an individual. The method includes a computer receiving social media contacts of the individual via one or more social media services. The method further include the computer receiving a sentiment. The method further includes the computer determining (1) features of an athletic event and (2) encouragement topics that reference the features of the athletic event. The method further includes using the one or more social media services, the computer soliciting encouraging messages from the social media contacts so that the encouraging messages have the sentiment and include content described by the encouragement topics. The method further includes in response to the step of soliciting, the computer receiving the encouraging messages from the social media contacts. The encouraging messages have the sentiment and include the content described by the encouragement topics. The method further includes during the athletic event, the computer determining a feature included in the features of the athletic event is likely to be encountered by the individual within a first specified amount of time based on a geographic position of the individual. The method further includes during the athletic event and based on the feature being likely to be encountered within the first specified amount of time, the computer selecting an encouraging message from the encouraging messages so that the selected encouraging message references the feature and presenting the selected encouraging message to the individual.

In a second embodiment, the present invention provides a computer program product including a computer-readable storage device and a computer-readable program code stored in the computer-readable storage device. The computer-readable program code includes instructions that are executed by a central processing unit (CPU) of a computer system to implement a method of managing messages for an individual. The method includes the computer system receiving social media contacts of the individual via one or more social media services. The method further include the computer system receiving a sentiment. The method further includes the computer system determining (1) features of an athletic event and (2) encouragement topics that reference the features of the athletic event. The method further includes using the one or more social media services, the computer system soliciting encouraging messages from the social media contacts so that the encouraging messages have the sentiment and include content described by the encouragement topics. The method further includes in response to the step of soliciting, the computer system receiving the encouraging messages from the social media contacts. The encouraging messages have the sentiment and include the content described by the encouragement topics. The method further includes during the athletic event, the computer system determining a feature included in the features of the athletic event is likely to be encountered by the individual within a first specified amount of time based on a geographic position of the individual. The method further includes during the athletic event and based on the feature being likely to be encountered within the first specified amount of time, the computer system selecting an encouraging message from the encouraging messages so that the selected encouraging message references the feature and presenting the selected encouraging message to the individual.

In a third embodiment, the present invention provides a computer system including a central processing unit (CPU); a memory coupled to the CPU; and a computer-readable storage device coupled to the CPU. The storage device includes instructions that are executed by the CPU via the memory to implement a method of managing messages for an individual. The method includes the computer system receiving social media contacts of the individual via one or more social media services. The method further include the computer system receiving a sentiment. The method further includes the computer system determining (1) features of an athletic event and (2) encouragement topics that reference the features of the athletic event. The method further includes using the one or more social media services, the computer system soliciting encouraging messages from the social media contacts so that the encouraging messages have the sentiment and include content described by the encouragement topics. The method further includes in response to the step of soliciting, the computer system receiving the encouraging messages from the social media contacts. The encouraging messages have the sentiment and include the content described by the encouragement topics. The method further includes during the athletic event, the computer system determining a feature included in the features of the athletic event is likely to be encountered by the individual within a first specified amount of time based on a geographic position of the individual. The method further includes during the athletic event and based on the feature being likely to be encountered within the first specified amount of time, the computer system selecting an encouraging message from the encouraging messages so that the selected encouraging message references the feature and presenting the selected encouraging message to the individual.

Embodiments of the present invention advantageously enhance an individual's performance in an athletic event or another type of event, or the individual's behavior or emotional state during the event by playing back encouraging messages from social media contacts at critical times during the event.

DETAILED DESCRIPTION

Overview

Embodiments of the present invention recognize that an athlete participating in an endurance event may need encouragement at a particular point in the event. The encouragement is needed to enhance the performance of the athlete. Known message delivery systems are limited to non-intelligently providing an athlete with predetermined system-generated messages or a playlist of human-generated messages.

Embodiments of the present invention provide a mobile device application that generates a pool of encouraging messages and plays back the encouraging messages to an athlete at critical times during an endurance event in order to enhance the athlete's physical performance during the endurance event. In one embodiment, an encouraging message having a particular type of sentiment from a social media contact of an athlete participating in an endurance event is intelligently delivered to the athlete based on a particular challenging feature of the endurance event being imminent, the effectiveness of prior messages from the same social media contact to the athlete, and the effectiveness of the same type of sentiment in prior messages to the athlete. For example, the athlete may be competing in the Boston Marathon which has particular terrain features, such as Heartbreak Hill, which present performance challenges for most runners. The system described herein may solicit social media contacts before the Boston Marathon occurs or during the race to record messages of encouragement that reference respective terrain features of the race.

In other embodiments, the present invention generates encouraging messages from social media contacts of an individual and plays the messages for the individual at critical times during an event in order to enhance the individual's behavior, emotional state, or performance in an activity other than an athletic endurance event.

System for Managing Encouraging Messages

Figure 1:
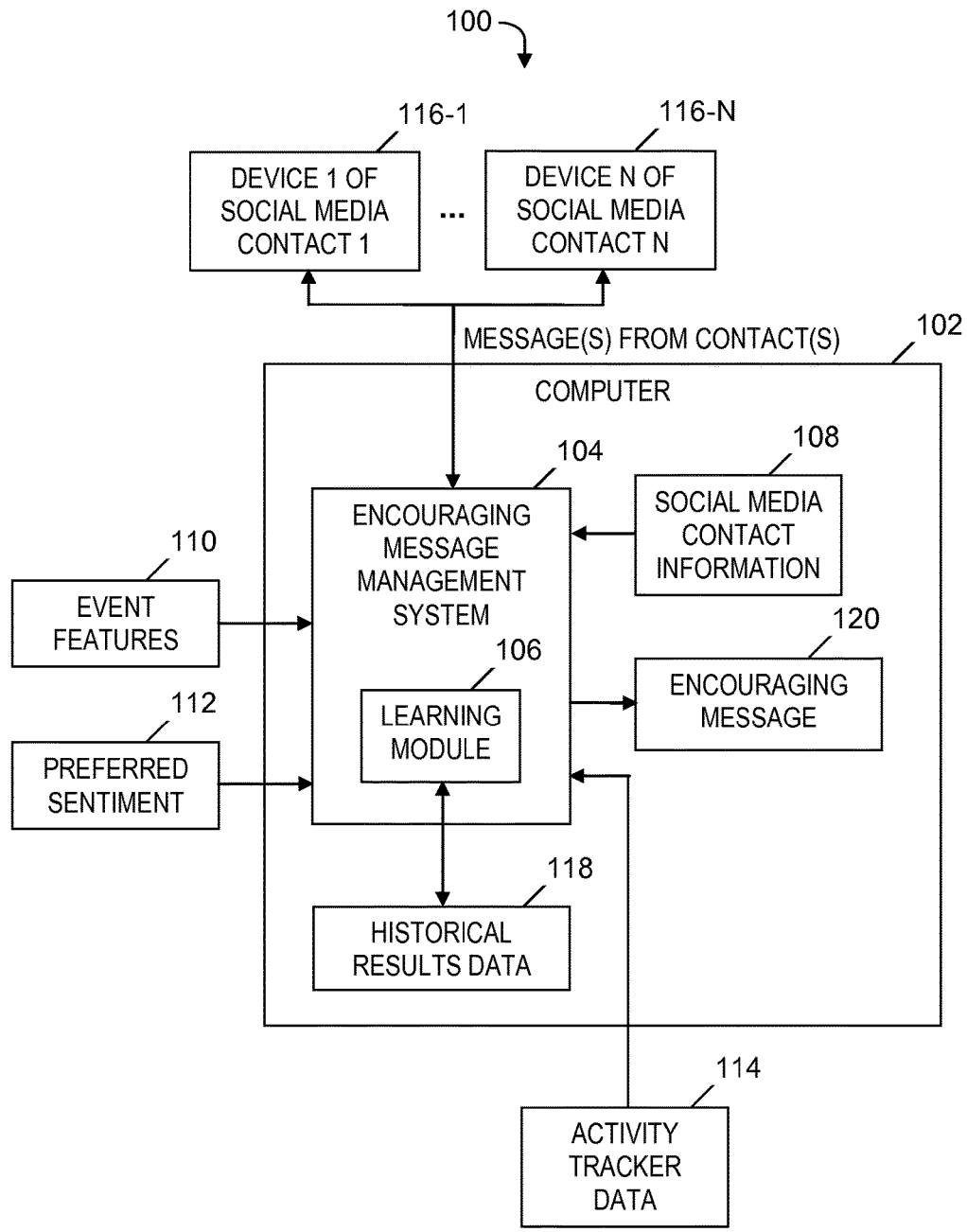
FIG. 1 is a block diagram of a system for managing encouraging messages from social media contacts to enhance performance, behavior, or emotional state, in accordance with embodiments of the present invention.

FIG. 1 is a block diagram of a system for managing encouraging messages from social media contacts to enhance performance, behavior, or emotional state, in accordance with embodiments of the present invention. System 100 includes a computer 102 which executes a software-based encouraging message management system 104, which includes a learning module 106. In one embodiment, computer 102 is a mobile device such as a smartphone. In another embodiment, computer 102 is a wearable computer. In one embodiment, computer 102 is carried or worn by the individual while the individual is participating in the event.

Encouraging message management system 104 receives social media contact information 108, which specifies contacts of an individual, where the contacts are stored by a social media service. Encouraging message management system 104 receives event features 110 (e.g., terrain features, weather conditions, competitor landscape, etc.) and a preferred sentiment 112, which indicates a type of encouraging message that the individual participating in the event desires or that is determined to be effective from results collected during the same event and/or prior events. The preferred sentiment 112 may indicate, for example, that an athlete participating in an endurance event desires a statement of positive reinforcement or an expression of tough love.

During the event, encouraging message management system 104 receives real-time or near real-time activity tracker data 114 that includes fitness-related metrics monitored and tracked by an activity tracker device or other wearable computer worn by the individual participating in the event. In one embodiment, the activity tracker device is synced to computer 102. In one embodiment, activity tracker data 114 includes one or more of the following metrics: the current pace of the athlete during a race, the position of the athlete on the course of the race, and the heart rate of the athlete.

Encouraging message management system 104 sends solicitation messages to N devices 116-1, ..., 116-N which are used by N social media contacts of the individual who is participating in the event. N is an integer greater than or equal to one. The solicitation messages provide information about one or more event features 110 the athlete is about to encounter during the event and solicit the social media contact(s) to record and send encouraging messages that reference event features 110 and are expressions indicated by preferred sentiment 112. Encouraging message management system 104 receives the recorded encouraging messages from the N social media contacts via devices 116-1, ..., 116-N and plays back the recorded encouraging messages to the individual at specified points of time during the event and/or in response to the individual arriving at, encountering, or being within a threshold distance of specified geographic points associated with the event (e.g., in response to a runner in the Boston Marathon arriving at the beginning of Heartbreak Hill).

Encouraging message management system 104 monitors activity tracker data 114 after playing back each message and stores the individual's performance (e.g., pace and heart rate) that results from the individual hearing the playback of the encouraging messages. Encouraging message management system 104 stores the results in historical results data 118, which is included in a data repository (not shown).

Encouraging message management system 104 learns from historical results data 118 that stores the individual's performance in multiple results along with respective tuples of <social media contact, encouragement topic about an event feature, sentiment>. The learning from historical results data 118 allows encouraging message management system 104 to select a particular tuple that will likely improve the performance of the individual in the event in which the individual is currently participating (i.e., the "current event"). Encouraging message management system 104 selects the tuple from historical results data 118 so that the tuple has an encouragement topic that matches an upcoming feature in the current event. The stored historical results data 118 associates the tuple with prior performance results that indicate that the individual improved her/his performance after being presented with an encouraging message from the social media contact specified by the tuple, where the encouraging message has the sentiment specified by the tuple.

Encouraging message management system 104 then solicits an encouraging message from the social media contact included in the selected tuple, where the solicitation for the encouraging message includes a request for the encouraging message to have the sentiment included in the selected tuple. After receiving the solicited encouraging message from the social media contact, encouraging message management system 104 plays back the encouraging message (i.e., encouraging message 120) to the individual, who responds with improved performance in the current event in response to encountering the event feature referenced by the encouragement topic.

Figure 2:
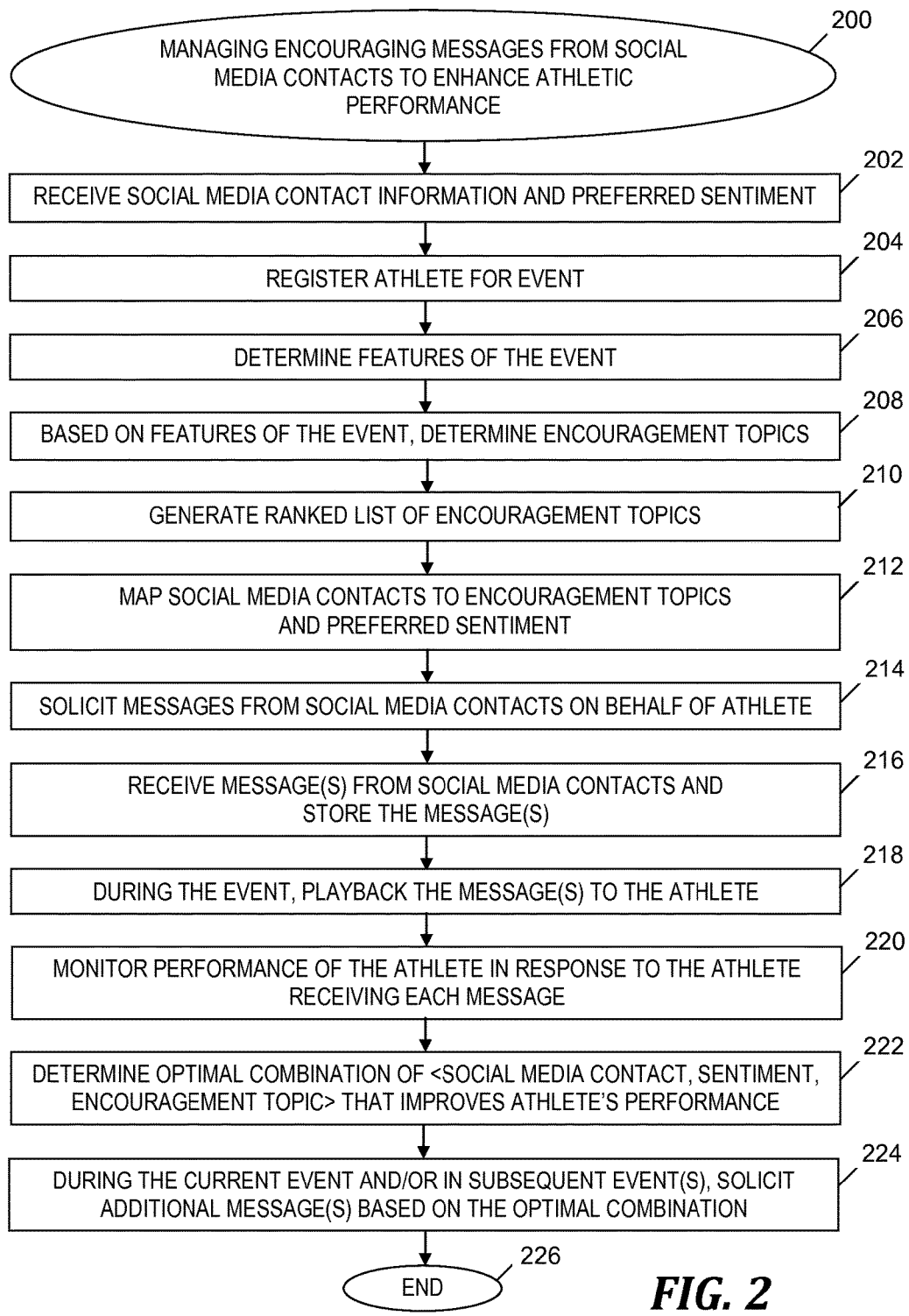
FIG. 2 is a flowchart of a process for managing encouraging messages from social media contacts to enhance athletic performance, where the process is implemented in the system of FIG. 1, in accordance with embodiments of the present invention.
Figure 4:
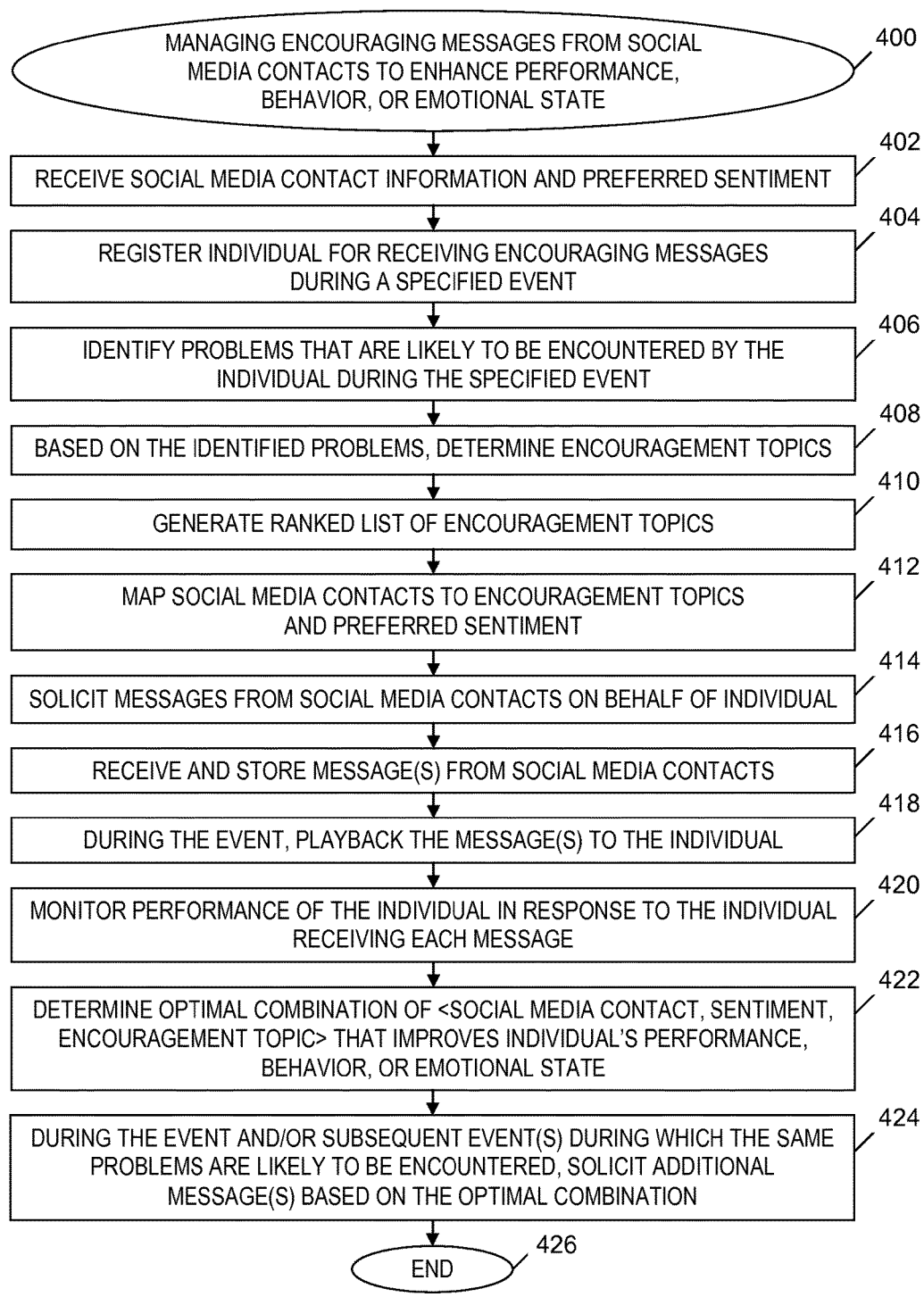
FIG. 4 is a flowchart of a process for managing encouraging messages from social media contacts to enhance performance, behavior, or emotional state, in accordance with embodiments of the present invention.
Figure 5:
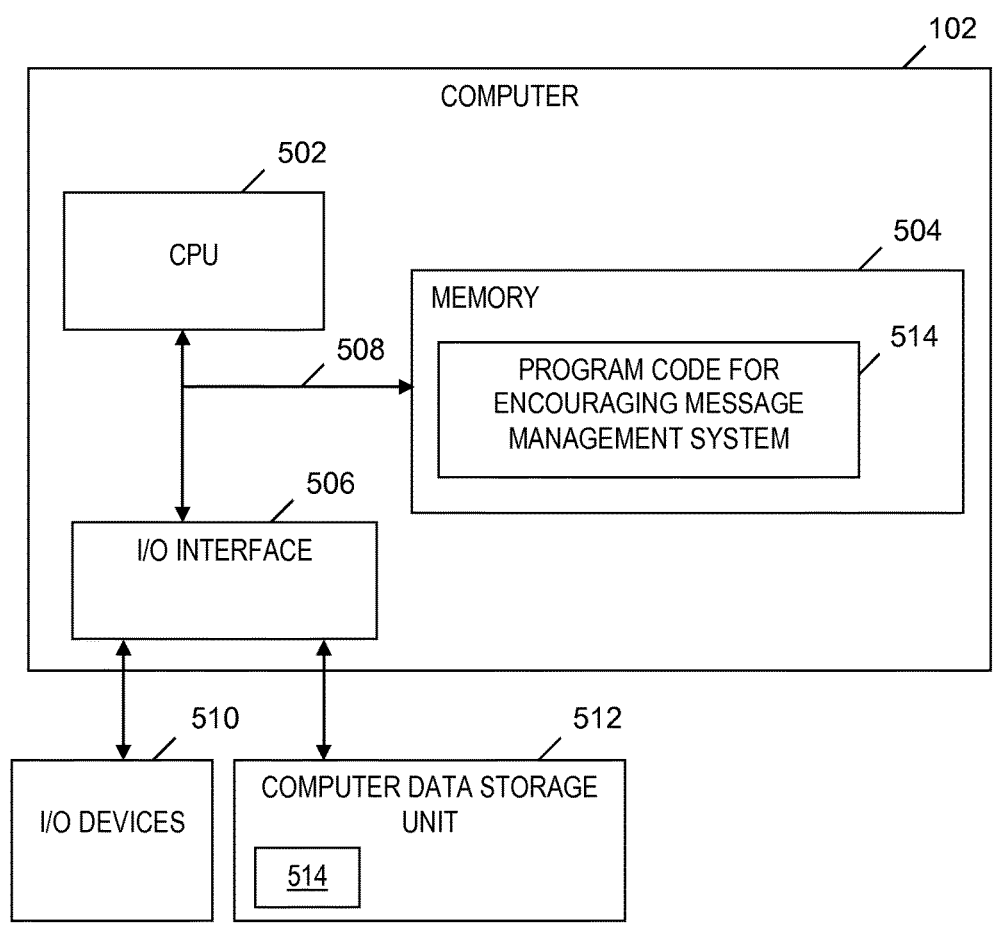
FIG. 5 is a block diagram of a computer that is included in the system of FIG. 1 and that implements the process of FIG. 2 or FIG. 4, in accordance with embodiments of the present invention.

The functionality of the components shown in FIG. 1 is described in more detail in the discussion of FIG. 2, FIG. 4, and FIG. 5 presented below.

Process for Managing Encouraging Messages to Enhance Athletic Performance

FIG. 2 is a flowchart of a process for managing encouraging messages from social media contacts to enhance athletic performance, where the process is implemented in the system of FIG. 1, in accordance with embodiments of the present invention. The process of FIG. 2 starts at step 200. In step 202, encouraging message management system 104 (see FIG. 1) receives social media contact information 108 (see FIG. 1) and preferred sentiment 112 (see FIG. 1). The social media contact information 108 (see FIG. 1) may be provided by the athlete via a user interface provided by encouraging message management system 104 (see FIG. 1), or the athlete may authorize encouraging message management system 104 (see FIG. 1) to automatically connect to one or more social media services to obtain the social media contact information 108 (see FIG. 1).

Encouraging message management system 104 (see FIG. 1) may derive the preferred sentiment 112 (see FIG. 1) from a personality profile completed by the athlete, from an A/B analysis of historical results data 118 indicating the effect of prior encouraging messages on the athlete's performance, or a statistical spread describing the types of encouraging messages already stored (e.g., encouraging message management system 104 (see FIG. 1) does not have any "tough love" messages, so the next message solicited will request a "tough love" message).

In one embodiment, the social media contact information 108 (see FIG. 1) includes measures that indicate how influential each social media contact is to the athlete (e.g., based on the amount and/or frequency of communication between each social media contact and the athlete via each social media service). The athlete may provide an initial version of social media contact information 108 (see FIG. 1) that identifies a set of social media contacts that the athlete considers to be the people (e.g., spouse, parent, etc.) whose messages will be the most influential in positively affecting the athlete's performance.

In step 204, encouraging message management system 104 (see FIG. 1) registers an athlete for an event, such as an endurance event (e.g., a marathon).

In step 206, encouraging message management system 104 (see FIG. 1) determines features of the event that have a likelihood of presenting a challenge or problem to the athlete in response to the athlete encountering each of the features. The challenge or problem presented by each feature is a likely cause of a negative effect on the athlete's performance in the event.

In step 208, encouraging message management system 104 (see FIG. 1) determines encouragement topics that reference respective features determined in step 206. In one embodiment, the encouragement topics reference a combination of the following features: terrain features of the event (e.g., a heartbreak hill), weather conditions, competitor landscape, and density data. The competitor landscape is an indication of how the athlete ranks compared to other athletes competing in the event, where the athlete and the other athletes share at least one common attribute, such as age group and gender. The density data indicates the population densities of spectators at different geographic areas that the athlete will be near during the event. For example, density data indicates which areas along a marathon course will be sparsely populated with spectators, which indicates areas that the athlete may want to receive an encouraging message.

Encouraging message management system 104 (see FIG. 1) may determine information about the aforementioned features referenced by the encouragement topics from using publicly available topography maps of the course used in the event, historical population density data for the course from previously held events, publicly available weather forecasts as the start of the event approaches, registry information for participants registered to participate in the event, etc.

In step 210, encouraging message management system 104 (see FIG. 1) generates a ranked list of the encouragement topics determined in step 208. In one embodiment, the athlete provides initial rankings to indicate the athlete's prediction of how much each encouragement topic will positively affect the athlete's performance. For example, an athlete may rank density data relatively high and rank competitor landscape relatively low, which will increase the likelihood that encouraging message management system 104 (see FIG. 1) plays back an encouraging message in response to the athlete arriving at a portion of the course that is sparsely populated with spectators, but will decrease the likelihood that encouraging message management system 104 (see FIG. 1) plays back an encouraging message in response to the athlete dropping out of the top 25% of runners in the athlete's gender and age group.

In step 212, encouraging message management system 104 (see FIG. 1) generates a map linking the social media contacts received in step 202 to the encouragement topics determined in step 208 and the preferred sentiment received in step 202. The map generated in step 212 includes tuples, where each tuple includes <social media contact, preferred sentiment, encouragement topic>. In one embodiment, step 212 generates a map linking only the most influential social media contacts to only the most highly ranked encouragement topics (i.e., link the social media contacts received in step 202 that are considered to have a measure of influence that exceeds a threshold value of influence to the encouragement topics that were ranked above a threshold ranking in step 210).

In step 214, based on the map generated in step 212, encouraging message management system 104 (see FIG. 1) solicits encouraging messages from social media contacts on behalf of the athlete, where the solicitation requests that the encouraging messages have the preferred sentiment received in step 202 and reference the encouragement topics determined in step 208. In one embodiment, encouraging message management system 104 (see FIG. 1) requests that the solicited encouraging messages reference only those encouragement topics whose rank in the ranked list generated in step 210 is higher than a specified threshold ranking.

In step 216, in response to the soliciting performed in step 214, social media contact(s) record encouraging message(s) and send the recorded encouraging message(s) to computer 102 (see FIG. 1). Also in step 216, in response to the soliciting performed in step 214, encouraging message management system 104 (see FIG. 1) receives the encouraging message(s) sent by the social media contact(s) and stores the encouraging message(s) in a data repository included in or coupled to computer 102 (see FIG. 1).

Prior to step 218, and during the event, encouraging message management system 104 (see FIG. 1) determines the current geographic location of the athlete, and based on the current geographic location, determines that the athlete is arriving at or encountering one of the features determined in step 206. Alternatively, encouraging message management system 104 (see FIG. 1) determines that the current geographic location of the athlete indicates that the athlete is within a predefined threshold distance from one of the features determined in step 206.

In one embodiment, the determination of the current geographic location of the athlete is performed after step 216. Alternatively, the determination of the current geographic location of the athlete is performed prior to step 214, and the solicitation in step 214 is performed based in part on the encouraging message management system 104 (see FIG. 1) determining that the athlete is arriving at, encountering, or being within a predefined threshold distance of one of the features determined in step 206.

In step 218, during the event and in response to determining the athlete is arriving at or encountering the features, or is within the threshold distance of the feature, encouraging message management system 104 (see FIG. 1) retrieves and plays back (or otherwise presents) at least one of the stored, recorded encouraging messages that reference the feature and that have the preferred sentiment received in step 202. The athlete may hear the play back of the encouraging message(s) via headphones, ear buds, or other loudspeakers (not shown in FIG. 1) coupled to computer 102 (see FIG. 1).

In step 220, encouraging message management system 104 (see FIG. 1) monitors the performance of the athlete that results from the athlete hearing or otherwise being presented with the encouraging message in step 218. The monitoring of the performance of the athlete includes receiving activity tracker data 114 (see FIG. 1) (i.e., biometric readings) from a wearable computer or other mobile device that is worn by, carried by, or otherwise attached to the athlete. In one embodiment, encouraging message management system 104 (see FIG. 1) monitors the heart rate and/or the pace of the athlete in step 220. In one embodiment, encouraging message management system 104 (see FIG. 1) monitors the pace of the athlete for rolling windows of time after the encouraging message is played back in step 218.

The monitoring of the performance in step 220 may also include encouraging message management system 104 (see FIG. 1) determining and recording the athlete's overall result in the event (e.g., in what place the runner finished the race, the runner's placement within the runner's age group and gender, etc.)

Although not shown in FIG. 2, steps 218 and 220 are repeated in response to the athlete during the event arriving at, encountering, or being within the threshold distance of other feature(s) determined in step 206.

In step 222, encouraging message management system 104 (see FIG. 1) determines an effectiveness metric for each encouraging message played back in step 218. The effectiveness metric is based on quantitative measures of the activity tracker data 114 (see FIG. 1), the pace for rolling windows of time after the message was played back, and the athlete's overall result in the event. Also in step 222, based on the effectiveness metrics, encouraging message management system 104 (see FIG. 1) determines an optimal combination (i.e., tuple) of <social media contact, sentiment, encouragement topic> that optimally enhances the athlete's performance in response to the athlete being presented with an encouraging message that has the attributes specified by the combination. Determining the optimal combination may utilize an A/B analysis within a single event or over time across multiple events.

In step 224, encouraging message management system 104 (see FIG. 1) learns from the combination determined in step 222 so that later during the same event and/or during subsequent event(s), encouraging message management system 104 (see FIG. 1) solicits additional encouraging message(s) based on the combination determined in step 222. That is, encouraging message management system 104 (see FIG. 1) solicits additional message(s) that are from the social media contact specified in the combination, have the sentiment specified in the combination, and that reference the encouragement topic specified in the combination.

The process of FIG. 2 ends at step 226.

Example

Figure 3:
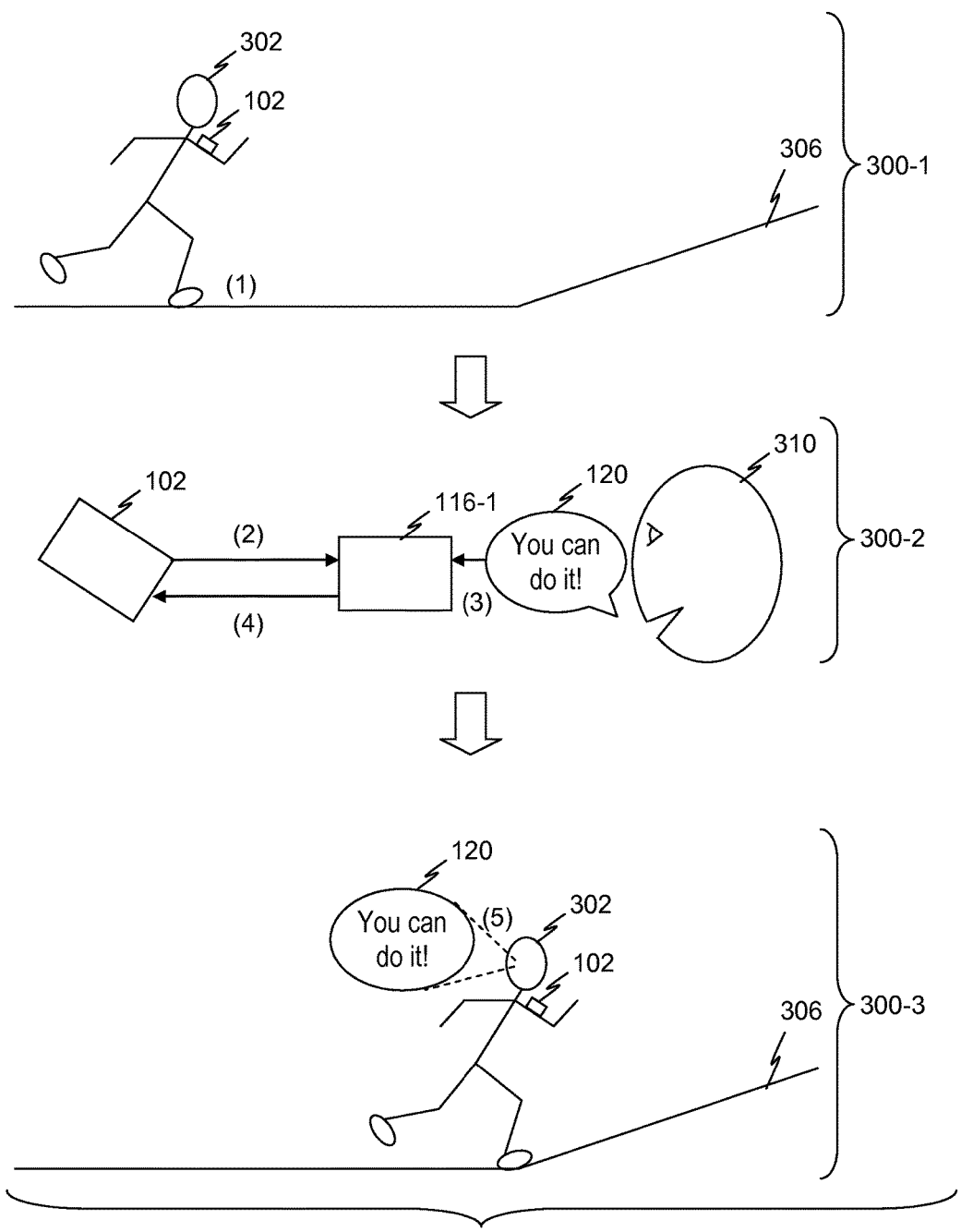
FIG. 3 is an example of managing an encouraging message from a runner's social media contact to enhance the performance of the runner participating in an endurance event, where the management of the encouraging message utilizes the process of FIG. 2, in accordance with embodiments of the present invention.

FIG. 3 is an example of managing an encouraging message from a runner's social media contact to enhance the performance of the runner participating in an endurance event, where the management of the encouraging message utilizes the process of FIG. 2, in accordance with embodiments of the present invention. The example in FIG. 3 is presented as a sequence of three sets of actions taking place during a marathon: first set of actions 300-1, second set of actions 300-2, and third set of actions 300-3.

In first set of actions 300-1, an athlete 302 is running in a marathon with a computer 102 (i.e., a smartphone) in an armband (not shown) attached to the arm of athlete 302. The first set of actions 300-1 includes the athlete 302 approaching a heartbreak hill 306, which is one of event features 110 (see FIG. 1) determined in step 206 (see FIG. 2). At the step labeled (1) in FIG. 3, encouraging message management system 104 (see FIG. 1) determines prior to step 214 (see FIG. 2) the current geographic location of the athlete 302, and based on the current geographic location, determines that the athlete 302 is within X yards of heartbreak hill 306 (i.e., within a predefined threshold distance from one of the features determined in step 206).

In the step labeled (2) (i.e., step 214 in FIG. 2) in second set of actions 300-2, during the marathon event and in response to determining the athlete 302 is within the threshold distance of heartbreak hill 306, encouraging message management system 104 (see FIG. 1) sends a solicitation to device 116-1 which is used by the athlete's mother 310 (i.e., social media contact 1 of athlete 302). Mother 310 records encouraging message 120 (i.e., "You can do it") into device 116-1 at the step labeled (3). In the step labeled (4) (i.e., step 216 in FIG. 2), encouraging message management system 104 receives encouraging message 120 from device 116-1.

In the step labeled (5) (i.e., step 218 in FIG. 2) in the third set of actions 300-3, computer 102 (e.g., a smartphone) plays back encouraging message 120 (i.e., "You can do it") that was recorded by mother 310 so that athlete 302 hears encouraging message 120 as the athlete starts running on heartbreak hill 306.

Process for Managing Encouraging Messages to Enhance Performance, Behavior, or Emotional State FIG. 4 is a flowchart of a process for managing encouraging messages from social media contacts to enhance performance, behavior, or emotional state, in accordance with embodiments of the present invention. The process of FIG. 4 utilizes an extension of the process of FIG. 2, with the athlete described in the discussion of FIG. 2 being replaced with other individuals that may benefit from a curated pool of encouraging messages. For example, people that have certain neurodevelopmental disorders may benefit from encouraging messages from key people in their lives. As other examples, other groups that may benefit from encouraging messages include individuals who are injured, sick, or traveling far from home. The process of FIG. 4 starts at step 400. In step 402, encouraging message management system 104 (see FIG. 1) receives social media contact information 108 (see FIG. 1) and preferred sentiment 112 (see FIG. 1), as described above in the discussion of step 202 (see FIG. 2).

In step 404, encouraging message management system 104 (see FIG. 1) registers an individual for receiving encouraging messages during an event or activity.

In step 406, encouraging message management system 104 (see FIG. 1) identifies problems that are likely to be encountered by the individual during the event or activity. Each identified problem is a likely cause of a negative effect on the individual's performance, behavior, or emotional state during the event or activity.

In step 408, encouraging message management system 104 (see FIG. 1) determines encouragement topics that reference the problems identified in step 406.

In step 410, encouraging message management system 104 (see FIG. 1) generates a ranked list of the encouragement topics determined in step 408. In one embodiment, the individual provides initial rankings to indicate the individual's prediction of how much each encouragement topic will positively affect the individual's performance, behavior, or emotional state during the event or activity.

In step 412, encouraging message management system 104 (see FIG. 1) generates a map linking the social media contacts received in step 402 to the encouragement topics determined in step 408 and the preferred sentiment received in step 402. The map generated in step 412 includes tuples, where each tuple includes <social media contact, preferred sentiment, encouragement topic>. In one embodiment, step 412 generates a map linking only the most influential social media contacts to only the most highly ranked encouragement topics (i.e., link the social media contacts received in step 402 that are considered to have a measure of influence on the individual that exceeds a threshold value of influence to the encouragement topics that were ranked above a threshold ranking in step 410).

In step 414, based on the map generated in step 412, encouraging message management system 104 (see FIG. 1) solicits encouraging messages from social media contacts on behalf of the individual, where the solicitation requests that the encouraging messages have the preferred sentiment received in step 402 and reference the encouragement topics determined in step 408. In one embodiment, encouraging message management system 104 (see FIG. 1) requests that the solicited encouraging messages reference only those encouragement topics whose rank in the ranked list generated in step 410 is higher than a specified threshold ranking.

In step 416, in response to the soliciting performed in step 414, social media contact(s) record encouraging message(s) and send the recorded encouraging message(s) to computer 102 (see FIG. 1). Also in step 416, in response to the soliciting performed in step 414, encouraging message management system 104 (see FIG. 1) receives the encouraging message(s) sent by the social media contact(s) and stores the encouraging message(s) in a data repository included in or coupled to computer 102 (see FIG. 1).

Prior to step 418, and during the event, encouraging message management system 104 (see FIG. 1) determines the current geographic location of the individual or an amount of time that has elapsed from the start of the event or activity, and based on the current geographic location or the amount of time that has elapsed, determines that the individual is encountering or is about to encounter one of the problems identified in step 406.

In one embodiment, the determination of the current geographic location or the amount of time that has elapsed is performed after step 416. Alternatively, the determination of the current geographic location or the amount of time that has elapsed is performed prior to step 414, and the solicitation in step 414 is performed based in part on the encouraging message management system 104 (see FIG. 1) determining that the individual is encountering or is about to encounter within a predefined amount of time one of the problems determined in step 406.

In step 418, during the event and in response to determining the individual is encountering or is about to encounter one of the problems, encouraging message management system 104 (see FIG. 1) retrieves and plays back (or otherwise presents) at least one of the stored, recorded encouraging messages that reference the problem and that have the preferred sentiment received in step 402.

In step 420, encouraging message management system 104 (see FIG. 1) monitors the performance, behavior, or emotional state of the individual that results from the individual hearing or otherwise being presented with the encouraging message in step 418. The monitoring of the performance, behavior, or emotional state of the individual may include receiving activity tracker data 114 (see FIG. 1) (i.e., biometric readings) from a wearable computer or other mobile device that is worn by, carried by, or otherwise attached to the individual. In one embodiment, encouraging message management system 104 (see FIG. 1) monitors the heart rate of the individual.

Although not shown in FIG. 4, steps 418 and 420 are repeated in response to the individual during the event encountering or being about to encounter within a predefined amount of time other problem(s) determined in step 406.

In step 422, encouraging message management system 104 (see FIG. 1) determines an effectiveness metric for each encouraging message played back in step 418. The effectiveness metric may be based on quantitative measures of the activity tracker data 114 (see FIG. 1). Also in step 422, based on the effectiveness metrics, encouraging message management system 104 (see FIG. 1) determines an optimal combination (i.e., tuple) of <social media contact, sentiment, encouragement topic> that optimally enhances the individual's performance, behavior, or emotional state in response to the individual being presented with an encouraging message that has the attributes specified by the combination. Determining the optimal combination may utilize an A/B analysis within a single event or activity or over time across multiple events or activities.

In step 424, encouraging message management system 104 (see FIG. 1) learns from the combination determined in step 422 so that later during the same event and/or during subsequent event(s), encouraging message management system 104 (see FIG. 1) solicits additional encouraging message(s) based on the combination determined in step 422. That is, encouraging message management system 104 (see FIG. 1) solicits additional message(s) that are from the social media contact specified in the combination, have the sentiment specified in the combination, and that reference the encouragement topic specified in the combination.

The process of FIG. 4 ends at step 426.

Computer System

FIG. 5 is a block diagram of a computer that is included in the system of FIG. 1 and that implements the process of FIG. 2 or FIG. 4, in accordance with embodiments of the present invention. Computer 102 is a computer system that generally includes a central processing unit (CPU) 502, a memory 504, an input/output (I/O) interface 506, and a bus 508. Computer 102 is coupled to I/O devices 510 and a computer data storage unit 512. CPU 502 performs computation and control functions of computer 102, including executing instructions included in program code 514 for encouraging message management system 104 (see FIG. 1) to perform a method of managing messages for an individual, where the instructions are executed by CPU 502 via memory 504. CPU 502 may include a single processing unit, or be distributed across one or more processing units in one or more locations (e.g., on a client and server).

Memory 504 includes a known computer readable storage medium, which is described below. In one embodiment, cache memory elements of memory 504 provide temporary storage of at least some program code (e.g., program code 514) in order to reduce the number of times code must be retrieved from bulk storage while instructions of the program code are executed. Moreover, similar to CPU 502, memory 504 may reside at a single physical location, including one or more types of data storage, or be distributed across a plurality of physical systems in various forms. Further, memory 504 can include data distributed across, for example, a local area network (LAN) or a wide area network (WAN).

I/O interface 506 includes any system for exchanging information to or from an external source. I/O devices 510 include any known type of external device, including a display device, keyboard, etc. Bus 508 provides a communication link between each of the components in computer 102, and may include any type of transmission link, including electrical, optical, wireless, etc.

I/O interface 506 also allows computer 102 to store information (e.g., data or program instructions such as program code 514) on and retrieve the information from computer data storage unit 512 or another computer data storage unit (not shown). Computer data storage unit 512 includes a known computer-readable storage medium, which is described below. In one embodiment, computer data storage unit 512 is a non-volatile data storage device, such as a magnetic disk drive (i.e., hard disk drive) or an optical disc drive (e.g., a CD-ROM drive which receives a CD-ROM disk).

Memory 504 and/or storage unit 512 may store computer program code 514 that includes instructions that are executed by CPU 502 via memory 504 to manage messages for an individual. Although FIG. 5 depicts memory 504 as including program code 514, the present invention contemplates embodiments in which memory 504 does not include all of code 514 simultaneously, but instead at one time includes only a portion of code 514.

Further, memory 504 may include an operating system (not shown) and may include other systems not shown in FIG. 5.

Storage unit 512 and/or one or more other computer data storage units (not shown) that are coupled to computer 102 may store any combination of social media contact information 108 (see FIG. 1), event features 110 (see FIG. 1), preferred sentiment 112 (see FIG. 1), and activity tracker data 114 (see FIG. 1).

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to managing messages for an individual. Thus, an embodiment of the present invention discloses a process for supporting computer infrastructure, where the process includes providing at least one support service for at least one of integrating, hosting, maintaining and deploying computer-readable code (e.g., program code 514) in a computer system (e.g., computer 102) including one or more processors (e.g., CPU 502), wherein the processor(s) carry out instructions contained in the code causing the computer system to manage messages for an individual. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of managing messages for an individual.

While it is understood that program code 514 for managing messages for an individual may be deployed by manually loading directly in client, server and proxy computers (not shown) via loading a computer-readable storage medium (e.g., computer data storage unit 512), program code 514 may also be automatically or semi-automatically deployed into computer 102 by sending program code 514 to a central server or a group of central servers. Program code 514 is then downloaded into client computers (e.g., computer 102) that will execute program code 514. Alternatively, program code 514 is sent directly to the client computer via e-mail. Program code 514 is then either detached to a directory on the client computer or loaded into a directory on the client computer by a button on the e-mail that executes a program that detaches program code 514 into a directory. Another alternative is to send program code 514 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 514 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of managing messages for an individual. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium (or media) (memory 504 and computer data storage unit 512) having computer readable program instructions 514 thereon for causing a processor (e.g., CPU 502) to carry out aspects of the present invention.

The computer readable storage medium can be a tangible device that can retain and store instructions (e.g., program code 514) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 514) described herein can be downloaded to respective computing/processing devices (e.g., computer 102) from a computer readable storage medium or to an external computer or external storage device (e.g., computer data storage unit 512) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 514) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2 and FIG. 4) and/or block diagrams (e.g., FIG. 1 and FIG. 5) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 514).

These computer readable program instructions may be provided to a processor (e.g., CPU 502) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 512) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 514) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of managing messages for an individual, the method comprising the steps of:
   a computer receiving social media contacts of the individual via one or more social media services;
   the computer deriving a sentiment from an A/B analysis of historical data indicating that a type of an encouraging message was effective in improving a performance of the individual in one or more running races prior to a current running race in which the individual is participating;
   the computer determining (1) terrain features of a course of the current running race and (2) encouragement topics that reference the terrain features of the course of the current running race, the terrain features presenting a challenge to the individual in response to the individual encountering the terrain features in the current running race;
   using the one or more social media services, the computer soliciting encouraging messages from the social media contacts so that the encouraging messages have the sentiment derived from the A/B analysis of the historical data that the type of the encouraging message was effective in improving the performance of the individual and include content described by the encouragement topics that references the terrain features of the course of the current running race;
   in response to the step of soliciting, the computer receiving the encouraging messages from the social media contacts, the encouraging messages having the sentiment and including the content described by the encouragement topics;
   during the current running race, the computer determining that a terrain feature included in the terrain features of the course of the current running race is likely to be encountered by the individual within a first specified amount of time based on a geographic position of the individual; and
   during the current running race and based on the terrain feature being likely to be encountered within the first specified amount of time, the computer selecting an encouraging message from the encouraging messages so that the selected encouraging message references the terrain feature, has the sentiment derived from the A/B analysis, and includes the content that references the terrain feature, and the computer presenting the selected encouraging message to the individual, which enhances a pace of the individual in the current running race.

2. The method of claim 1, further comprising the steps of:
   the computer monitoring a performance of the individual in the current running race after the step of presenting the selected encouraging message;
   based on the monitored performance, the computer determining that an enhancement of the performance of the individual in the current running race results from the individual being presented with the encouraging message, the encouraging message having the sentiment, referencing the terrain feature, and being from a social media contact included in the social media contacts;
   subsequent to the individual encountering the terrain feature, and during the current running race or during another, subsequent running race in which the individual is participating, the computer determining that another terrain feature identical or similar to the terrain feature is likely to be encountered by the individual within the first specified amount of time; and
   based on the other terrain feature being likely to be encountered by the individual within the first specified amount of time, the computer selecting another encouraging message from the social media contact, the other encouraging message having the sentiment and referencing the other terrain feature, and presenting the selected other encouraging message to the individual so that another performance of the individual in the current running race or the other running race is likely to be enhanced.

3. The method of claim 1, further comprising the steps of:
   the computer receiving an indication that the individual prefers the encouraging message to have the sentiment based on the encouraging message being from the social media contact and referencing the terrain feature; and
   based on the received indication, the computer requesting the social media contact to provide the encouraging message so that the encouraging message has the sentiment.

4. The method of claim 1, wherein the step of soliciting includes the computer requesting the social media contact to provide content in the encouraging message that references the terrain feature.

5. The method of claim 1, wherein the step of receiving the social media contacts includes the computer identifying the social media contacts as being the individuals who interact with the individual via the one or more social media services at a frequency or an amount that exceeds a threshold value.

6. The method of claim 1, further comprising:
   the computer determining multiple sentiments preferred by the individual as the individual is encountering respective features of the current running race, the respective features including (i) the terrain features, (ii) weather conditions of the current running race, (iii) a population density of spectators at a geographic area which the individual is near during the current running race, and a ranking of the individual compared to other individuals participating in the current running race, the individual and the other individuals sharing common attributes of an age group and a gender;
   using the one or more social media services, the computer soliciting other encouraging messages that have respective sentiments selected from the multiple sentiments;
   subsequent to the step of presenting the encouraging message, the computer selecting a second encouraging message from the other encouraging messages, the second encouraging message having a second sentiment which is included in the multiple sentiments and which is different from the sentiment of the presented encouraging message;
   the computer determining the individual is encountering a second feature of the athletic event;
   based on the individual encountering the second feature, the computer selecting the second encouraging message having the second sentiment rather than again selecting the encouraging message that had been presented; and
   the computer presenting the second encouraging message to the individual, which results in an enhancement of the performance of the individual in the current running race.

7. The method of claim 1, further comprising the steps of:
   the computer receiving preferences of the individual for receiving encouragement in response to encountering respective features of the current running race, the respective features including (i) the terrain features, (ii) weather conditions of the current running race, (iii) a population density of spectators at a geographic area which the individual is near during the current running race, and a ranking of the individual compared to other individuals participating in the current running race, the individual and the other individuals sharing common attributes of an age group and a gender;

based on the preferences, the computer assigning ranks to the features, wherein the step of soliciting the encouraging messages includes soliciting encouraging messages whose content references a proper subset of one or more features included in the features, wherein the one or more features have assigned ranks that exceed a threshold rank.

8. The method of claim 1, further comprising the step of:

providing at least one support service for at least one of creating, integrating, hosting, maintaining, and deploying computer-readable program code in the computer, the program code being executed by a processor of the computer to implement the steps of receiving the social media contacts, deriving the sentiment; determining the terrain features and the encouragement topics, soliciting the encouraging messages, receiving the encouraging messages, determining that the terrain feature is likely to be encountered, selecting the encouraging message, and presenting the selected encouraging message.

9. A computer program product, comprising:

a computer-readable, storage device; and a computer-readable program code stored in the computer-readable, storage device, the computer-readable program code containing instructions that are executed by a central processing unit (CPU) of a computer system to implement a method of managing messages for an individual, the method comprising the steps of:

the computer system receiving social media contacts of the individual via one or more social media services;

the computer system deriving a sentiment from an A/B analysis of historical data indicating that a type of an encouraging message was effective in improving a performance of the individual in one or more running races prior to a current running race in which the individual is participating;

the computer system determining (1) terrain features of a course of the current running race and (2) encouragement topics that reference the terrain features of the course of the current running race, the terrain features presenting a challenge to the individual in response to the individual encountering the terrain features in the current running race;

using the one or more social media services, the computer system soliciting encouraging messages from the social media contacts so that the encouraging messages have the sentiment derived from the A/B analysis of the historical data that the type of the encouraging message was effective in improving the performance of the individual and include content described by the encouragement topics that references the terrain features of the course of the current running race;

in response to the step of soliciting, the computer system receiving the encouraging messages from the social media contacts, the encouraging messages having the sentiment and including the content described by the encouragement topics;

during the current running race, the computer system determining that a terrain feature included in the terrain features of the course of the current running race is likely to be encountered by the individual within a first specified amount of time based on a geographic position of the individual; and during the current running race and based on the terrain feature being likely to be encountered within the first specified amount of time, the computer system selecting an encouraging message from the encouraging messages so that the selected encouraging message references the terrain feature, has the sentiment derived from the A/B analysis, and includes the content that references the terrain feature, and the computer system presenting the selected encouraging message to the individual, which enhances a pace of the individual in the current running race.

10. The computer program product of claim 9, wherein the method further comprises the steps of:

the computer system monitoring a performance of the individual in the current running race after the step of presenting the selected encouraging message;

based on the monitored performance, the computer system determining that an enhancement of the performance of the individual in the current running race results from the individual being presented with the encouraging message, the encouraging message having the sentiment, referencing the terrain feature, and being from a social media contact included in the social media contacts;

subsequent to the individual encountering the terrain feature, and during the current running race or during another, subsequent running race in which the individual is participating, the computer system determining that another terrain feature identical or similar to the terrain feature is likely to be encountered by the individual within the first specified amount of time; and based on the other terrain feature being likely to be encountered by the individual within the first specified amount of time, the computer system selecting another encouraging message from the social media contact, the other encouraging message having the sentiment and referencing the other terrain feature, and presenting the selected other encouraging message to the individual so that another performance of the individual in the current running race or the other running race is likely to be enhanced.

11. The computer program product of claim 9, wherein the method further comprises the steps of:

the computer system receiving an indication that the individual prefers the encouraging message to have the sentiment based on the encouraging message being from the social media contact and referencing the terrain feature; and based on the received indication, the computer system requesting the social media contact to provide the encouraging message so that the encouraging message has the sentiment.

12. The computer program product of claim 9, wherein the step of soliciting includes the computer system requesting the social media contact to provide content in the encouraging message that references the terrain feature.

13. The computer program product of claim 9, wherein the step of receiving the social media contacts includes the computer system identifying the social media contacts as being the individuals who interact with the individual via the one or more social media services at a frequency or an amount that exceeds a threshold value.

14. The computer program product of claim 9, wherein the method further comprises the steps of:
the computer system determining multiple sentiments preferred by the individual as the individual is encountering respective features of the current running race, the respective features including (i) the terrain features, (ii) weather conditions of the current running race, (iii) a population density of spectators at a geographic area which the individual is near during the current running race, and a ranking of the individual compared to other individuals participating in the current running race, the individual and the other individuals sharing common attributes of an age group and a gender;
using the one or more social media services, the computer system soliciting other encouraging messages that have respective sentiments selected from the multiple sentiments;
subsequent to the step of presenting the encouraging message, the computer system selecting a second encouraging message from the other encouraging messages, the second encouraging message having a second sentiment which is included in the multiple sentiments and which is different from the sentiment of the presented encouraging message;
the computer system determining the individual is encountering a second feature of the athletic event;
based on the individual encountering the second feature, the computer system selecting the second encouraging message having the second sentiment rather than again selecting the encouraging message that had been presented; and
the computer system presenting the second encouraging message to the individual, which results in an enhancement of the performance of the individual in the current running race.

15. A computer system comprising:
a central processing unit (CPU);
a memory coupled to the CPU; and
a computer readable storage device coupled to the CPU, the storage device containing instructions that are executed by the CPU via the memory to implement a method of managing messages for an individual, the method comprising the steps of:
the computer system receiving social media contacts of the individual via one or more social media services;
the computer system deriving a sentiment from an A/B analysis of historical data indicating that a type of an encouraging message was effective in improving a performance of the individual in one or more running races prior to a current running race in which the individual is participating;
the computer system determining (1) terrain features of a course of the current running race and (2) encouragement topics that reference the terrain features of the course of the current running race, the terrain features presenting a challenge to the individual in response to the individual encountering the terrain features in the current running race;
using the one or more social media services, the computer system soliciting encouraging messages from the social media contacts so that the encouraging messages have the sentiment derived from the A/B analysis of the historical data that the type of the encouraging message was effective in improving the performance of the individual and include content described by the encouragement topics that references the terrain features of the course of the current running race;
in response to the step of soliciting, the computer system receiving the encouraging messages from the social media contacts, the encouraging messages having the sentiment and including the content described by the encouragement topics;
during the current running race, the computer system determining that a terrain feature included in the terrain features of the course of the current running race is likely to be encountered by the individual within a first specified amount of time based on a geographic position of the individual; and
during the current running race and based on the terrain feature being likely to be encountered within the first specified amount of time, the computer system selecting an encouraging message from the encouraging messages so that the selected encouraging message references the terrain feature, has the sentiment derived from the A/B analysis, and includes the content that references the terrain feature, and the computer system presenting the selected encouraging message to the individual, which enhances a pace of the individual in the current running race.

16. The computer system of claim 15, wherein the method further comprises the steps of:
the computer system monitoring a performance of the individual in the current running race after the step of presenting the selected encouraging message;
based on the monitored performance, the computer system determining that an enhancement of the performance of the individual in the current running race results from the individual being presented with the encouraging message, the encouraging message having the sentiment, referencing the terrain feature, and being from a social media contact included in the social media contacts;
subsequent to the individual encountering the terrain feature, and during the current running race or during another, subsequent running race in which the individual is participating, the computer system determining that another terrain feature identical or similar to the terrain feature is likely to be encountered by the individual within the first specified amount of time; and
based on the other terrain feature being likely to be encountered by the individual within the first specified amount of time, the computer system selecting another encouraging message from the social media contact, the other encouraging message having the sentiment and referencing the other terrain feature, and presenting the selected other encouraging message to the individual so that another performance of the individual in the current running race or the other athletic event is likely to be enhanced.

17. The computer system of claim 15, wherein the method further comprises the steps of:
the computer system receiving an indication that the individual prefers the encouraging message to have the sentiment based on the encouraging message being from the social media contact and referencing the terrain feature; and
based on the received indication, the computer system requesting the social media contact to provide the encouraging message so that the encouraging message has the sentiment.

18. The computer system of claim 15, wherein the step of soliciting includes the computer system requesting the social media contact to provide content in the encouraging message that references the terrain feature.

19. The computer system of claim 15, wherein the step of receiving the social media contacts includes the computer system identifying the social media contacts as being the individuals who interact with the individual via the one or more social media services at a frequency or an amount that exceeds a threshold value.

20. The computer system of claim 15, wherein the method further comprises the steps of:

the computer system determining multiple sentiments preferred by the individual as the individual is encountering respective features of the current running race, the respective features including (i) the terrain features, (ii) weather conditions of the current running race, (iii) a population density of spectators at a geographic area which the individual is near during the current running race, and a ranking of the individual compared to other individuals participating in the current running race, the individual and the other individuals sharing common attributes of an age group and a gender;

using the one or more social media services, the computer system soliciting other encouraging messages that have respective sentiments selected from the multiple sentiments;

subsequent to the step of presenting the encouraging message, the computer system selecting a second encouraging message from the other encouraging messages, the second encouraging message having a second sentiment which is included in the multiple sentiments and which is different from the sentiment of the presented encouraging message;

the computer system determining the individual is encountering a second feature of the athletic event;

based on the individual encountering the second feature, the computer system selecting the second encouraging message having the second sentiment rather than again selecting the encouraging message that had been presented; and the computer system presenting the second encouraging message to the individual, which results in an enhancement of the performance of the individual in the current running race.

* * * * *